DAVID KRONINGER & NOAH KRONINGER.
Improvement in Adjustable Buggy Seats.

No. 120,444. Patented Oct. 31, 1871.

UNITED STATES PATENT OFFICE.

DANIEL KRONINGER AND NOAH KRONINGER, OF EAGLE POINT, PENN.

IMPROVEMENT IN ADJUSTABLE BUGGY-SEATS.

Specification forming part of Letters Patent No. 120,444, dated October 31, 1871.

*To all whom it may concern:*

Figure 1:
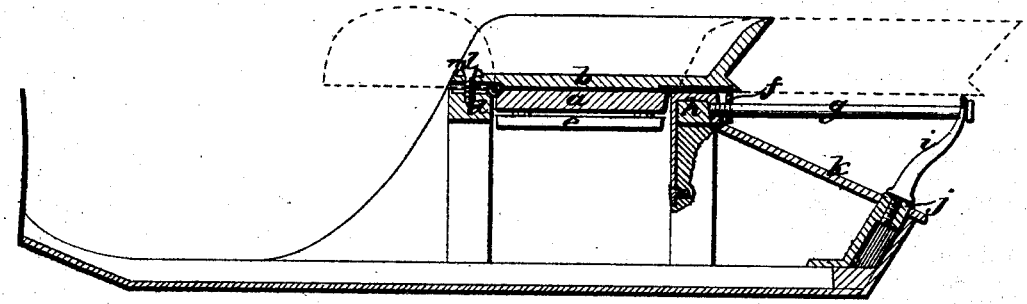
Figure 2:
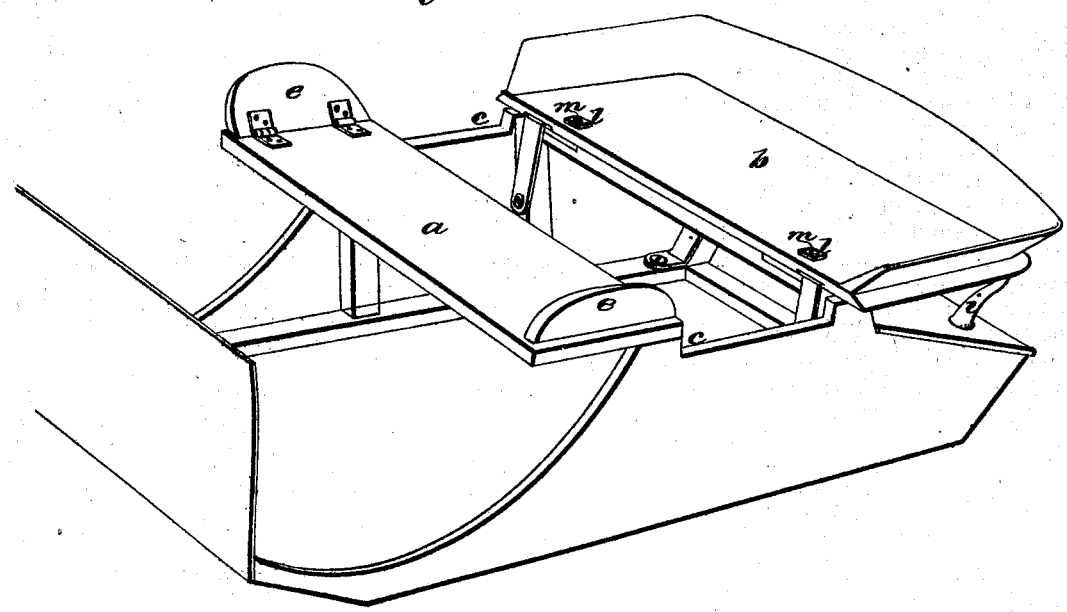

Be it known that we, DANIEL KRONINGER and NOAH KRONINGER, of Eagle Point, Berks county, Pennsylvania, have invented an Improvement in Adjustable Buggy-Seats, of which the following is a specification:

In the drawing, Figure 1 is a side elevation; Fig. 2, a top view; and Fig. 3, a rear elevation, with the guide-rods and standards removed.

The invention relates to that class of vehicles, whether buggies or sleighs, which have seats so adjustable that the vehicle may be made single-seated or double seated, at pleasure; the invention consisting in the peculiar means by which this result is accomplished.

Referring to the drawing, $a$ is the front seat of the buggy therein shown, and $b$ the back seat. In Fig. 1 we see the front seat inverted and occupying grooves $c$ cut in the sides of the buggy, and the back seat slid forward above the front one. In Fig. 2 the front seat is turned forward and its ends turned up, and the back seat slid to the rear far enough to leave sufficient space between it and the front seat to accommodate the legs of the occupants of the back seat. To bring about these adjustments the front seat is hinged to the rear side of a cross-bar, $d$, Fig. 1, and its end pieces $e$ are hinged, so as to turn back upon the top of the seat in order to be out of the way when the front seat is folding back into the grooves $c$. The hind seat is provided with eyes $f$, extending downward from its bottom near its two rear corners, which eyes inclose guide-rods $g$, whose front ends are screwed into nuts let into the back of the rear cross-bar $h$, and whose outer ends are supported in standards $i$ that are screwed into nuts $j$ let into the sloping cover $k$. This arrangement admits of sliding the seat $b$ back, as shown in Fig. 2. Nuts $l$ are let into the seat $b$ near its front edge, and tapped poles are made in plates that are sunk into the tops of the cross-bars $d$ $h$. Screws $m$, passing through the nuts $l$, connect the seat $b$, according to its position, either with the front or rear cross-bar, thus preventing the seat from tipping back. When the seat $b$ only is to be used the rods $g$ and standards $i$ can be unscrewed and stowed away in the bottom of the carriage. The nuts $j$ should be made so as to be ornamental when the standards are thus removed.

We claim as our invention—

The backwardly-sliding hind seat $b$, provided with the eyes $f$ placed at or near its rear side, and combined with the guide-rods $g$ located above the cover, removable standards $i$, nuts $j$, and sloping cover $k$, all arranged as specified.

DANIEL KRONINGER.
NOAH KRONINGER.

Witnesses:
H. H. SCHWARTZ,
A. M. BORTZ.

(31)